United States Patent
Kendall et al.

(10) Patent No.: US 7,328,314 B2
(45) Date of Patent: Feb. 5, 2008

(54) MULTIPROCESSOR COMPUTING DEVICE HAVING SHARED PROGRAM MEMORY

(75) Inventors: Chad Kendall, Vancouver (CA); Predrag Kostic, Burnaby (CA); Robert Elliott Robotham, Ottawa (CA)

(73) Assignee: Alcatel-Lucent Canada Inc., Ottawa (CA)

( * ) Notice: Subject to any disclaimer, the term of this patent is extended or adjusted under 35 U.S.C. 154(b) by 1125 days.

(21) Appl. No.: 10/173,589

(22) Filed: Jun. 19, 2002

(65) Prior Publication Data

US 2003/0235200 A1    Dec. 25, 2003

(51) Int. Cl.
*G06F 13/40* (2006.01)
(52) U.S. Cl. .................... 711/148; 711/5; 711/147; 711/168
(58) Field of Classification Search ............ None
See application file for complete search history.

(56) References Cited

U.S. PATENT DOCUMENTS

| | | | |
|---|---|---|---|
| 3,931,613 A * | 1/1976 | Gruner et al. .......... 711/169 |
| 4,034,347 A * | 7/1977 | Probert, Jr. ............ 709/214 |
| 5,581,734 A * | 12/1996 | DiBrino et al. ........ 711/169 |
| 6,457,100 B1 * | 9/2002 | Ignatowski et al. ..... 711/119 |

OTHER PUBLICATIONS

Naish et al. Design ASICs. 1998 state, Archive.org of May 24, 2000. http://web.ukonline.co.uk/paul.naish/DA/contents.htm.*

* cited by examiner

*Primary Examiner*—Sanjiv Shah
*Assistant Examiner*—Sam Dillon
(74) *Attorney, Agent, or Firm*—Oyen Wiggs Green & Mutala LLP (57) ABSTRACT

An instruction memory shared by a number of processing units has a plurality of individually accessible sections. A software program in the instruction memory is distributed among the memory sections. Sequential parts of the software program are in sequential sections. The software program may have a common portion which is repeated in each of the memory sections. Arbiter logic may control which of the processing units accesses which of the memory sections in each memory access cycle.

9 Claims, 7 Drawing Sheets

FIGURE 9

MULTIPROCESSOR COMPUTING DEVICE HAVING SHARED PROGRAM MEMORY

TECHNICAL FIELD

The invention relates to the field of data processing. The invention relates in particular to data processing devices having multiple processors which execute instructions from a shared program memory. The invention has application, for example, in network processors and image processors.

BACKGROUND

There are various situations in which multiple data processors operate simultaneously executing the same computer software to perform similar tasks. For example, network processors are devices which receive data packets in telecommunication networks and perform actions based upon information in the packet. Examples of actions performed by network processors include: forwarding a packet to a particular output port, assigning a packet to a priority queue, dropping a packet, etc. Since most network processing tasks must be performed individually for each packet, it is not uncommon for network processors to have an architecture in which the tasks of processing incoming packets are shared between a plurality of processing units. Each of the processing units executes the same computer software, which controls how the incoming packets are processed.

A large number of network processors may be fabricated on a single application specific integrated circuit (ASIC). Each processor executes instructions from an instruction memory. Some network processors have a common instruction memory shared by a number of processing units. For example, PCT publication No. WO 01/17179 discloses a network processor having N processing units which can concurrently execute picocode from a common instruction memory.

Image processing devices may also include multiple processing units which execute instructions from a common instruction memory.

A problem with such shared memory architectures is that each location in a common instruction memory can typically be accessed only by one processor at a time. Where this is the case, some processing units may not be able to obtain instructions from the common instruction memory when they need them. Such processors may stall until a time slice during which they can retrieve the instructions that they need from the common instruction memory. This is inefficient and reduces overall processing throughput.

SUMMARY OF THE INVENTION

The invention relates to methods and apparatus for providing a plurality of processing units with access to instructions to be executed by the processing units. The instructions are held in memory structure which is shared between the processing units.

One aspect of the invention provides an apparatus comprising: a plurality of processing units, a memory structure comprising a number of simultaneously accessible memory sections, and a memory section access control. The number of memory sections is at least equal to a number of the processing units. The memory structure is capable of holding software comprising a plurality of sequential parts with the parts distributed between the memory sections such that sequential parts are in sequential memory sections. The memory section access control is connected between the processing units and the memory structure and is configured to permit, on each of a plurality of successive memory access cycles, each of the processing units to retrieve one of the software parts from a different one of the memory sections. The memory section access control permits at least one of the processing units to retrieve sequential ones of the software parts from sequential ones of the memory sections on sequential memory access cycles.

Another aspect of the invention provides a method for providing a plurality of processing units with access to a shared instruction memory containing software to be executed by the processing units. The method comprises distributing the software among a plurality of simultaneously accessible memory sections such that sequential parts are in sequential memory sections; in each of a plurality of memory access cycles, for each of the processing units, retrieving a part of the software from a different one of the memory sections; and, in sequential ones of the memory access cycles, for at least one of the processing units, retrieving sequential parts of the software from sequential ones of the memory sections.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
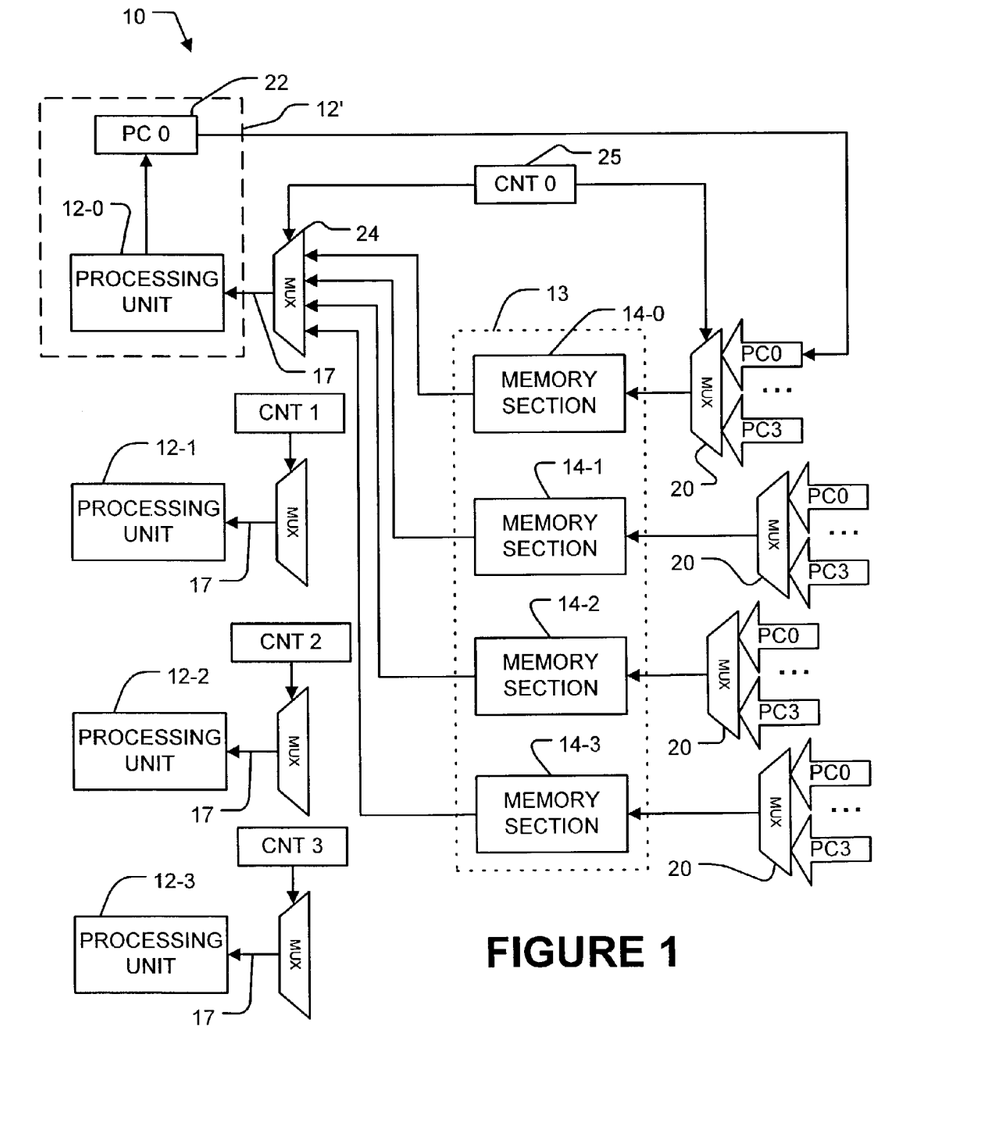
FIG. 1 is a schematic view of an instruction memory architecture for a set of processing units according to one embodiment of the invention.

FIG. 1 shows a multi-processor data processing apparatus 10 according to one embodiment of the invention. Apparatus 10 comprises a number of processing units 12. It is convenient for apparatus 10 to comprise $2^m$ processing units 12 where m is an integer. Each processing unit 12 may comprise a processor core on an ASIC. Processing units 12 access and execute instructions stored in a memory structure 13. Memory structure 13 comprises a plurality of independently accessible sections 14. In the illustrated embodiment, memory structure 13 comprises four sections 14-0 through 14-3 which contain instructions for execution by for processing units 12.

Figure 2:
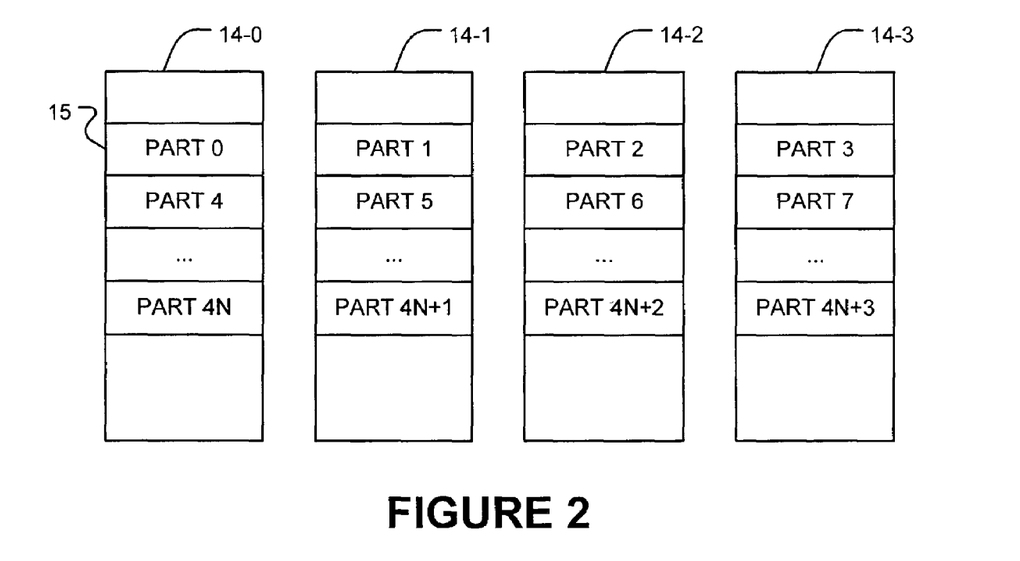
FIG. 2 is a schematic view of a possible organization of instructions in the instruction memory architecture of FIG. 1.

Memory structure 13 contains a software program 15 to be executed by processing units 12. As shown in FIG. 2, software program 15 comprises a number of parts (which each comprise one instruction or, optionally, multiple instructions). Each part preferably has a width equal to a width of the instruction buses 17 of processing units 12. Each part may, for example, comprise one word and instruction buses 17 may each have a width of one word. The word may be a word of, for example, 8, 16, 32 or 64 bits.

The parts are interleaved between sections 14-0 through 14-3. Section 14-0 contains parts 0, 4, 8, 12 etc. Section 14-1 contains parts 1, 5, 8, 13 etc. Section 14-2 contains parts 2, 6, 9, 14, etc. Section 14-3 contains parts 3, 7, 10, 15, etc.

A memory section access control is connected between processing units 12 and memory structure 13. The memory section access control determines which processing units 12 can access which memory sections 14 in each memory access cycle. In the embodiment of FIG. 1, the memory section access control comprises, for each section 14, an input multiplexer 20, output multiplexer 24 and a counter 25. Each counter 25 contains a value which is presented to control inputs of input multiplexer 20 and output multiplexer 24. This value may be termed a memory section selection value. Where there are $2^m$ processors, it is convenient for counters 25 to be m-bit counters.

Each processing unit 12 has a program counter 22. Program counter 22 is typically part of the processing unit 12 as indicated by the dashed line 12' in FIG. 1. Program counter 22 contains a value which indicates, directly or indirectly, a next part of software 15 to be fetched from memory structure 13 for execution by the associated processing unit 12. The program counters 22 associated with each processing unit 12 are presented at the inputs of each input multiplexer 20.

At an input of each memory section 14, input multiplexer 20 presents the program counter value for one of processing units 12. Which of the program counter values is presented to the input of the memory section 14 is determined by the value in counter 25. In each cycle, a part of software 15 is retrieved from each memory section 14 as specified by the value at the input of the section 14.

Each memory section 14 presents the retrieved part of software 15 at an output. Each output of a memory section 14 is connected to an input of each output multiplexer 24. An output from each output multiplexer 24 connects to a instruction bus 17 associated with one of processing units 12. Each of processing units 12 thereby receives instructions from one of memory sections 14 by way of an output multiplexer 24. The particular memory section 14 from which the instructions delivered to a particular processing unit 12 originate in a particular memory access cycle is determined by the value of the counter 25 associated with that processing unit 12.

Figure 3:
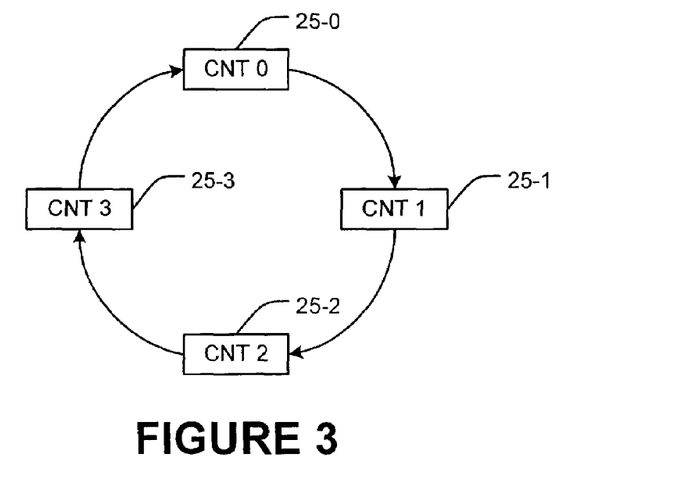
FIG. 3 is a diagram illustrating one way to control a simple round robin scheme for providing processing units with access to memory segments in the instruction memory architecture of FIG. 1.

The values within counters 25 are set such that, during each memory access cycle, each processing unit 12 has access to a different one of memory sections 14. In each subsequent memory access cycle, the values within counters 25 are changed, such that over a number of memory access cycles, each processing unit 12 will have access to each memory section 14 and all parts of software 15. For example, the values within counters 25 may be rotated as shown in FIG. 3. In the case where there are four memory sections 14 and four counters 25 identified as 25-0 through 25-3 then the values in counters 25 may rotate as shown in Table I.

TABLE I

| Memory Access Cycle | Possible Sequence of Counter Values | | | |
|---|---|---|---|---|
| | Counter Values | | | |
| | 25-0 (CNT 0) | 25-1 (CNT 1) | 25-2 (CNT 2) | 25-3 (CNT 3) |
| 1 | 0 | 3 | 2 | 1 |
| 2 | 1 | 0 | 3 | 2 |
| 3 | 2 | 1 | 0 | 3 |
| 4 | 3 | 2 | 1 | 0 |
| 5 | 0 | 3 | 2 | 1 |

For example, when the system of FIG. 1 is reset, each processor unit 12 is configured to begin running software 15. The program counter 22 of each processor unit 12 contains a value which identifies PART 0 of software 15. Since PART 0 is in memory section 14-0, only the processing unit 12-0 (which has access to memory section 14-0 on the first memory access cycle) will get the instruction it needs. Processing unit 12-0 is the only processing unit with access to memory section 14-0 on the first memory access cycle, because the value in its counter 25-0 corresponds with memory section 14-0. The other processing units 12 will stall.

On the second memory access cycle, processing unit 12-0 has access to memory section 14-1 and can retrieve PART 1 of software 15 (on the second memory access cycle, the value in counter 25-0 corresponds to memory section 14-1). On the second memory access cycle, processing unit 12-1 can retrieve PART 0 of software 15. The other two processing units 12, which are still waiting for access to PART 0 of software 15 will stall.

On and after the fourth memory access cycle, as long as none of processing units 12 execute a jump or branch in software 15, each processing unit 12 receives the next part of software 15 in round robin fashion. If a processing unit 12 does execute a jump or branch, then it stalls until a next memory access cycle in which that processor 12 has access to the memory section 14 containing the instruction being branched to. In the embodiment described above, a processing unit 12 that jumps or branches will stall in a given memory access cycle if the lowest two bits of the address in its program counter 22 do not match the value in its corresponding counter 25.

In many applications, software 15 comprises a relatively small section of commonly-executed code and a relatively large amount of code for handling situations which must be handled but which occur relatively rarely. For example, where processing units 12 are applied in packet processing, most of processing units 12 will spend most of the time executing commonly executed parts of software 15. Occasionally a processing unit 12 will encounter an exception, for example, an erroneous packet or cell transmission or a packet with options or the like. When this occurs, the processing unit 12 will branch to a less commonly-used part of software 15 which contains code for handling the exception.

Figure 4:
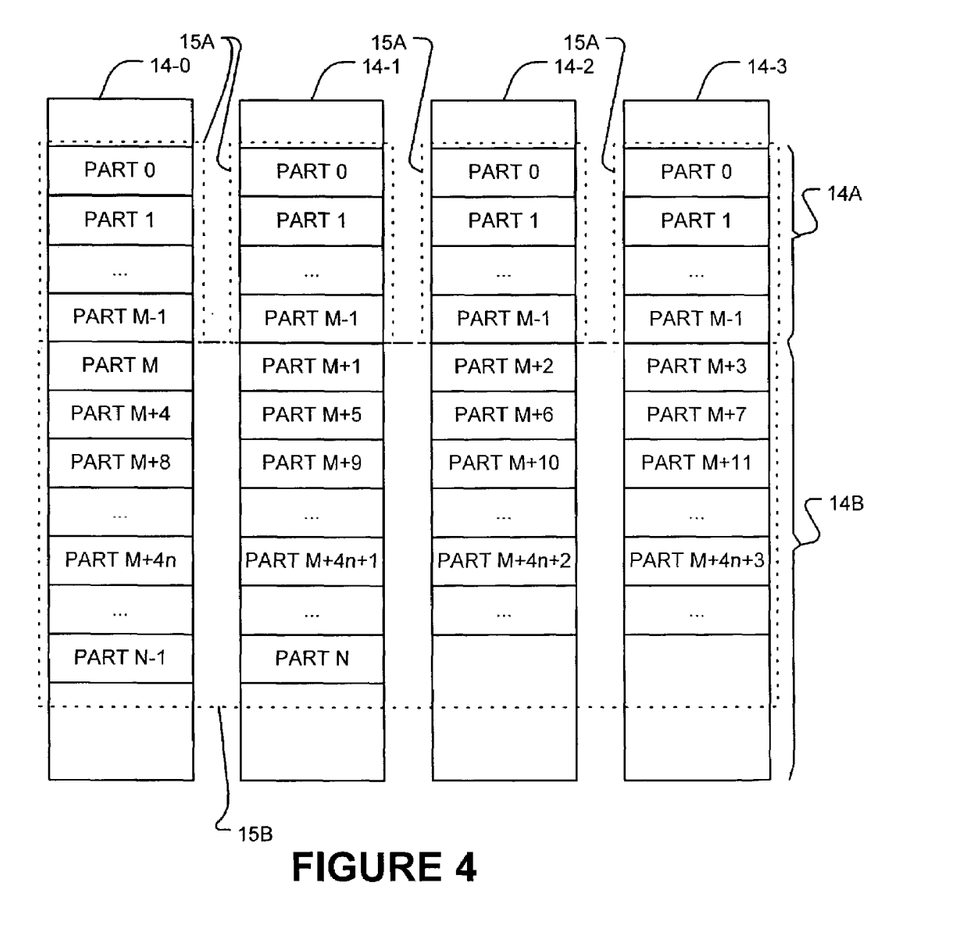
FIG. 4 is a schematic view of a further possible organization of instructions in the instruction memory architecture of FIG. 1.

In such situations, it can be advantageous to provide a complete commonly-used portion of software 15 in each of memory sections 14 and to distribute the remaining, less commonly-used, portions of software 15 among memory sections 14 as described above. FIG. 4 illustrates one possible arrangement of software 15 in memory sections 14. Memory sections 14 are each divided into two areas 14A and 14B. A first portion 15A of software 15 is repeated in each of memory sections 14. First portion 15A is located in area 14A. Portion 15A includes parts retrieved by program counter values in the range of 0 to M−1.

A second portion 15B of software 15 is divided among areas 14B of memory sections 14 as described above. Second portion 15B comprises parts retrieved by program counter values in the range of M to N. As shown in FIG. 4, parts M, M+4, M+8 and so on are located in area 14B of memory section 14-0, Parts M+1, M+5, M+9 and so on are located in area 14B of memory section 14-1. Other parts of second portion 15B are located in areas 14B of memory sections 14-2 and 14-3.

With the memory arrangement illustrated in FIG. 4, as long as processing units 12 are executing instructions found in portion 15A of software 15, there are no stalls since all parts of portion 15A are repeated in every one of memory sections 14. If a processing unit 12 branches to a part of software 15 which is in portion 15B, then the processing unit 12 may stall for up to three memory access cycles until it has access to the memory section 14 which contains the part of software 15 to which it is branching.

The relative sizes of memory areas 14A and 14B may be made configurable. Apparatus 10 may comprise a register containing a value representing an address which demarcates a boundary between memory areas 14A and memory areas 14B. By changing the value in the register one can make trade-offs between performance and the size of software 15. By setting the value so that all of sections 14 are treated as memory areas 14A, one can increase performance and avoid stalling at the expense of being able to accommodate a smaller amount software 15. By setting the value so that all of sections 14 are treated as memory areas 14B, one can increase capacity for software 15 at the expense of performance.

Figure 5:
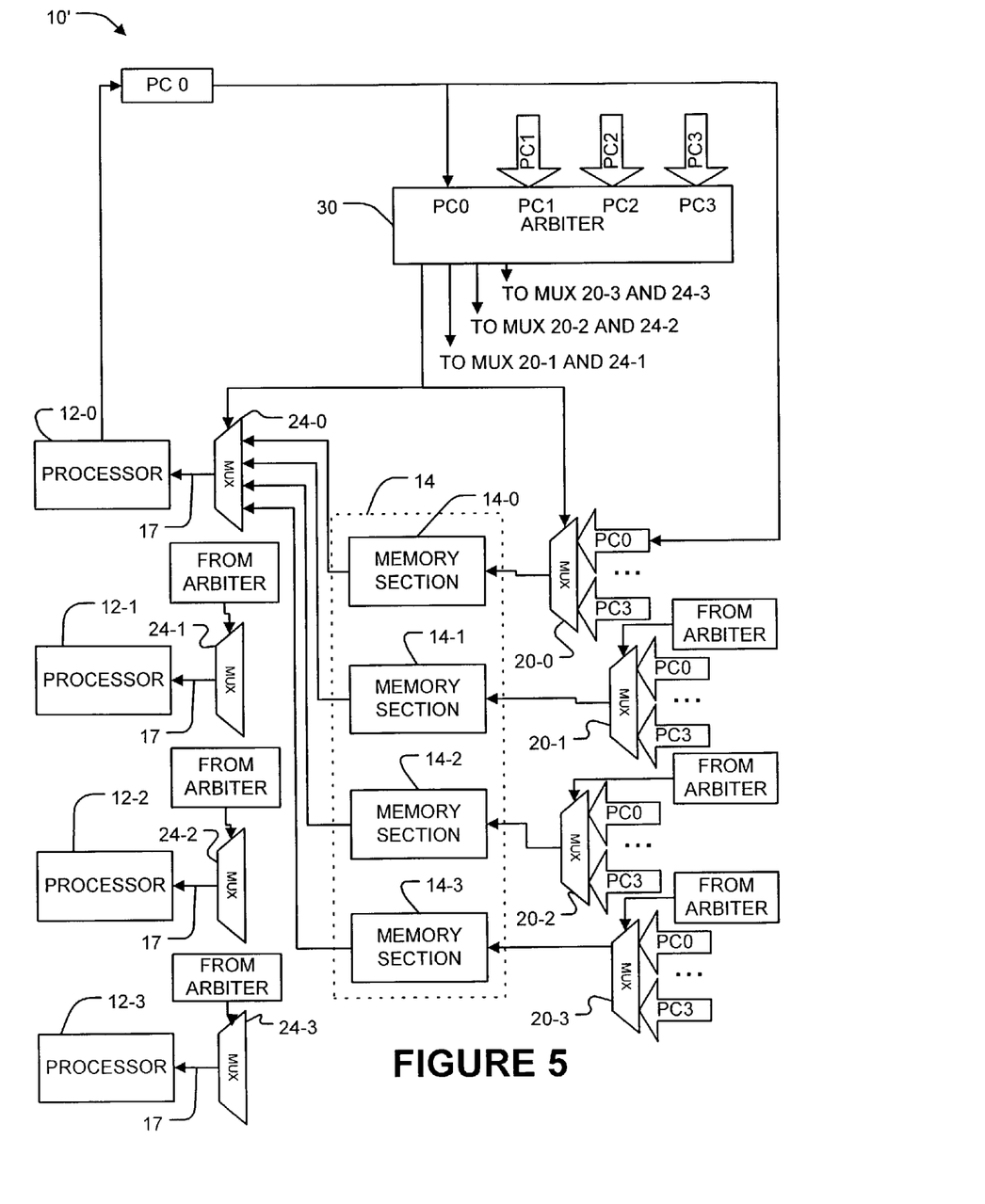
FIG. 5 is a schematic view of an instruction memory architecture for a set of processing units according to another embodiment of the invention which includes an arbiter.

FIG. 5 illustrates apparatus 10' according to an alternative embodiment of the invention. Apparatus 10' includes an arbiter 30 in place of counters 25. Arbiter 30 has inputs which receive program counter values from each of processing units 12 and outputs which control multiplexers 20 and 24. Arbiter 30 attempts to control multiplexers 20 and 24 to provide each of processing units 12 with access to the memory section 14 containing that part of software 15 which the processing unit 12 requires.

Arbiter 30 may be implemented in many different ways. In some embodiments, arbiter 30 may control multiplexers 20 and 24 to interchange the memory sections 14 from which two processing units 12 will retrieve instructions on the next memory access cycle. For example, consider the case where a first processing unit 12 requires a part of software 15 which is located in portion 15B (see FIG. 4). Since each part of portion 15B is located in only one memory section 14, that first processing unit 12 will stall on the next memory access unless it can have access to the particular memory section 14 containing the required part of software 15. Assume that, on the next memory access cycle, the first processing unit 12 would normally have access to a first memory section 14, a second processing unit 12 would normally have access to a second memory section 14 and that the second memory section (i.e. normally accessible by the second processing unit 12) contains the part of software 15 required by the first processing unit 12. Under these circumstances, arbiter 30 determines whether the number of processing units which will stall on the next memory access cycle can be reduced by interchanging access to the first and second memory sections 14 so that the first processing unit 12 will access the second memory section 14 and the second processing unit 12 will access the first memory section 14 on the next memory access cycle. If so, then arbiter 30 controls the multiplexers 20 and 24 associated with the first and second memory sections to implement this switch.

The number of stalled processors will be reduced by making such a switch if:

the second processing unit 12 is executing parts of software within common portion 15A (in which case the second processing unit does not care which memory section it has access to);

the second processing unit 12 is executing parts of software 15 within portion 15B and the part of software required by second processing unit 12 is not located in the second memory section 14; or, the second processing unit 12 is not active (as indicated, for example, by a reserved or non-present program counter value or a separate signal (not shown) provided to arbiter 30).

Figure 6:
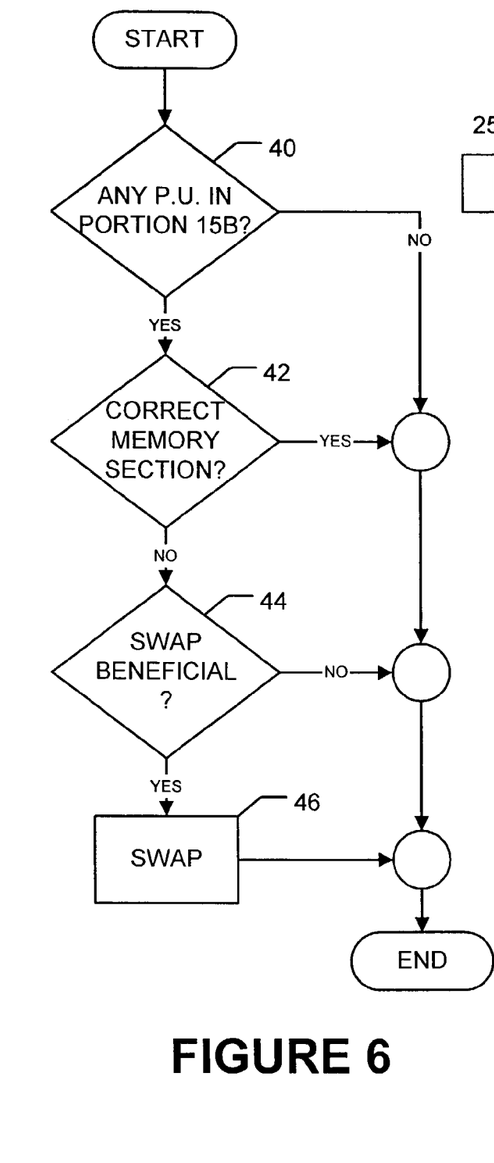
FIG. 6 is a flow diagram illustrating an algorithm that may be implemented in the arbiter of FIG. 5.

FIG. 6 illustrates possible logic which may be implemented in arbiter 30. Block 40 determines whether there is a processing unit 12 which requires a part of software 15 from portion 15B. This may be achieved in some embodiments by comparing a program counter value for the processing unit 12 in question with a value which divides areas 14A and 14B of memory sections 14. In block 42 arbiter 30 checks to determine whether such processing unit 12 would normally have access to the memory section 14 containing the required part of software 15. In some embodiments this may be achieved by inspecting the lowest-order bits of the program counter value. In block 44 arbiter 30 determines whether a swap would be beneficial (i.e. reduce a number of stalled processors on the next memory access cycle). If so, then arbiter 30 implements a swap in block 46.

Arbiter 30 may be implemented in the form of a logic circuit which produces at its outputs control signals for multiplexers 20 and 24. Arbiter 30 may have various architectures having various levels of complexity. A simple arbiter 30 may, for example, attempt to reduce stalls in a single stage. The arbiter 30 may, for example, interchange the memory sections 14 associated with one or more pairs of processing units 12 to reduce a number of processing units 12 which will stall on the next memory access cycle. A more complicated arbiter 30 may attempt further optimization at the expense of slower operation. An arbiter 30 may be used in cases where software 15 is organized as shown in FIG. 2 as well as in cases where software 15 is organized as shown in FIG. 4.

Table II provides a truth table for one embodiment of arbiter 30 for the special case where the program counters 22 for all processing units 12 either require a part of software 15 which is in portion 15A or are not active. These processor requirements are indicated by the letter "A" in the columns on the left hand side of Table II, which correspond to each of processing units 12-0 through 12-3. Since each of the processing units 12 is satisfied by access to any memory section 14, arbiter 30 does not need to alter the assignment of memory sections 14 to processing units 12. These memory section assignments are indicated by the numbers 0 to 3 in the columns on the right hand side of Table II, which correspond to each of processing units 12-0 through 12-3. The number 0 in the column for processing unit 12-0 indicates, for example, that on the next memory cycle, processing unit 12-0 will access the memory section 14 which would normally be assigned to processing unit 12-0 in the next memory access cycle.

TABLE II

ARBITER TRUTH TABLE

| PROCESSOR ACCESS REQUIREMENTS | | | | PROCESSOR ACCESS GRANTED | | | |
|---|---|---|---|---|---|---|---|
| 12-0 | 12-1 | 12-2 | 12-3 | 12-0 | 12-1 | 12-2 | 12-3 |
| A | A | A | A | 0 | 1 | 2 | 3 |

Tables III-0 through III-3 provide truth tables for one embodiment of arbiter 30 for the case where: (i) the program counters 22 for three of processing units 12 either require a part of software 15 which is in portion 15A or are not active; and (ii) the program counter 22 for one of processing units 12-0 requires access to a specific memory section 14.

TABLE III

-0-ARBITER TRUTH TABLE

| PROCESSOR ACCESS REQUIREMENTS | | | | PROCESSOR ACCESS GRANTED | | | |
|---|---|---|---|---|---|---|---|
| 12-0 | 12-1 | 12-2 | 12-3 | 12-0 | 12-1 | 12-2 | 12-3 |
| 0 | A | A | A | 0 | 1 | 2 | 3 |
| 1 | A | A | A | 1 | 0 | 2 | 3 |
| 2 | A | A | A | 2 | 1 | 0 | 3 |
| 3 | A | A | A | 3 | 1 | 2 | 0 |

TABLE III

-1- ARBITER TRUTH TABLE

| PROCESSOR ACCESS REQUIREMENTS | | | | PROCESSOR ACCESS GRANTED | | | |
|---|---|---|---|---|---|---|---|
| 12-0 | 12-1 | 12-2 | 12-3 | 12-0 | 12-1 | 12-2 | 12-3 |
| A | 0 | A | A | 1 | 0 | 2 | 3 |
| A | 1 | A | A | 0 | 1 | 2 | 3 |
| A | 2 | A | A | 0 | 2 | 1 | 3 |
| A | 3 | A | A | 0 | 3 | 2 | 1 |

TABLE III

-2- ARBITER TRUTH TABLE

| PROCESSOR ACCESS REQUIREMENTS | | | | PROCESSOR ACCESS GRANTED | | | |
|---|---|---|---|---|---|---|---|
| 12-0 | 12-1 | 12-2 | 12-3 | 12-0 | 12-1 | 12-2 | 12-3 |
| A | A | 0 | A | 2 | 1 | 0 | 3 |
| A | A | 1 | A | 0 | 2 | 1 | 3 |
| A | A | 2 | A | 0 | 1 | 2 | 3 |
| A | A | 3 | A | 0 | 1 | 3 | 2 |

TABLE III

-3- ARBITER TRUTH TABLE

| PROCESSOR ACCESS REQUIREMENTS | | | | PROCESSOR ACCESS GRANTED | | | |
|---|---|---|---|---|---|---|---|
| 12-0 | 12-1 | 12-2 | 12-3 | 12-0 | 12-1 | 12-2 | 12-3 |
| A | A | A | 0 | 3 | 1 | 2 | 0 |
| A | A | A | 1 | 0 | 3 | 2 | 1 |
| A | A | A | 2 | 0 | 1 | 3 | 2 |
| A | A | A | 3 | 0 | 1 | 2 | 3 |

Arbiter truth tables for cases in which 2, 3 or 4 of processing units 12 require access to specific memory sections 14 may be provided by extending the above. For example, Table IV is a possible truth table for the case where processing units 12-0 and 12-1 each require access to a specific memory section 14.

TABLE IV

ARBITER TRUTH TABLE

| PROCESSOR ACCESS REQUIREMENTS | | | | PROCESSOR ACCESS GRANTED | | | |
|---|---|---|---|---|---|---|---|
| 12-0 | 12-1 | 12-2 | 12-3 | 12-0 | 12-1 | 12-2 | 12-3 |
| 0 | 0 | A | A | 0 | 1 | 2 | 3 |
| 0 | 1 | A | A | 0 | 1 | 2 | 3 |
| 0 | 2 | A | A | 0 | 2 | 1 | 3 |
| 0 | 3 | A | A | 0 | 3 | 2 | 1 |
| 1 | 0 | A | A | 1 | 0 | 2 | 3 |
| 1 | 1 | A | A | 0 | 1 | 2 | 3 |
| 1 | 2 | A | A | 1 | 2 | 0 | 3 |
| 1 | 3 | A | A | 1 | 3 | 0 | 2 |
| 2 | 0 | A | A | 2 | 0 | 1 | 3 |
| 2 | 1 | A | A | 2 | 1 | 0 | 3 |
| 2 | 2 | A | A | 2 | 1 | 0 | 3 |
| 2 | 3 | A | A | 2 | 3 | 0 | 1 |
| 3 | 0 | A | A | 3 | 0 | 2 | 1 |
| 3 | 1 | A | A | 3 | 1 | 2 | 0 |
| 3 | 2 | A | A | 3 | 2 | 1 | 0 |
| 3 | 3 | A | A | 3 | 1 | 2 | 0 |

Figure 8:
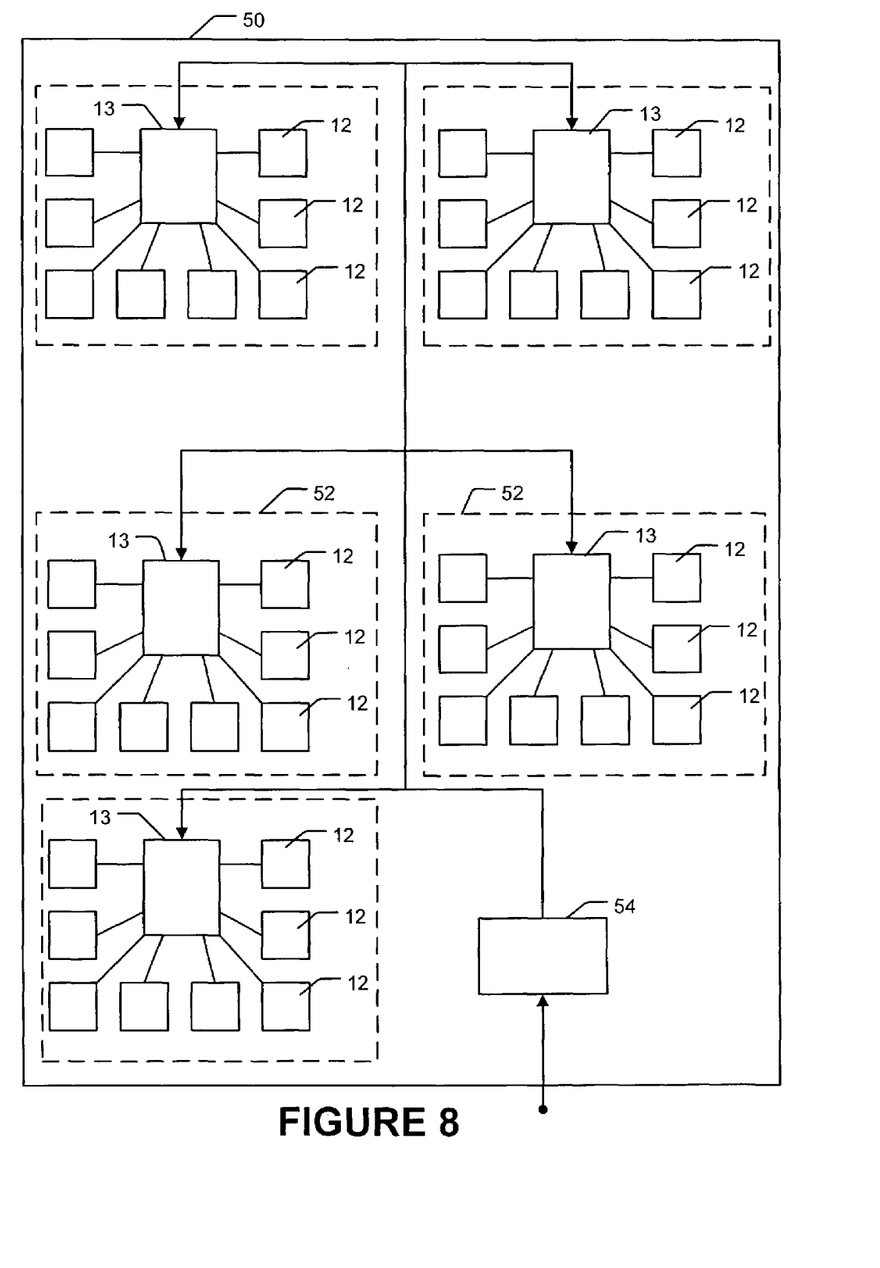
FIG. 8 illustrates an ASIC having a plurality of groups of processing units, each group of processing units having a shared memory structure; and, FIG. 9 is a schematic view of an instruction memory architecture for a set of processing units according to an alternative embodiment of the invention.

As shown schematically in FIG. 8, the invention may be embodied in an ASIC 50, which carries both processing units 12 and memory 13. In some embodiments, a single ASIC 50 carries a plurality of groups 52 of processing units 12, each group 52 also including an associated memory structure 13. Each group 52 may comprise, for example, 4 to 16 processing units 12. It is convenient for each group 52 to have $2^m$ processing units 12 and a memory structure 13 having $2^m$ memory sections 14. The ASIC illustrated schematically in FIG. 8 has five groups 52 of 8 processing units 12 as well as other circuitry (not shown). ASIC 50 may comprise memory write circuitry 54 configured to receive software to be stored in the memory structures 13 of the groups 52 (the software may, for example, be received from an off-chip source) and to concurrently write received software to the memory structures 13 of all of the groups 52.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure, but which perform the function in the illustrated exemplary embodiments of the invention.

As will be apparent to those skilled in the art in the light of the foregoing disclosure, many alterations and modifications are possible in the practice of this invention without departing from the spirit or scope thereof. For example, The invention may be applied to image processing, network processing, digital signal processing, or any other field in which it is desirable to have a number of processing units executing instructions from a common instruction memory.

It is not necessary to provide separate counters 25 to control input multiplexers 20 and output multiplexers 24. A state machine, or a number of state machines, which produce suitable control signals for the multiplexers could be used instead. A single counter associated with logic for carrying suitable control signals to each of the multiplexers could also be used.

It is not necessary that the number of memory sections 14 be equal to the number of processing units 12 serviced by those memory sections 14. There could be more memory sections 14 than processing units 12.

Where an arbiter 30 is provided, depending upon the capability of arbiter 30 it may not be necessary that the memory section 14 to which a particular processing unit 12 would normally have access be rotated among all of the available memory sections 14 as described for example, with reference to FIG. 3. The arbiter 30 may assign each processing unit to a memory section 14 for each memory access cycle in a manner which minimizes stalling and is not unfair to any of processing units 12. Arbiter 30 could include a mechanism for providing priority to certain processing units 12.

Figure 7:
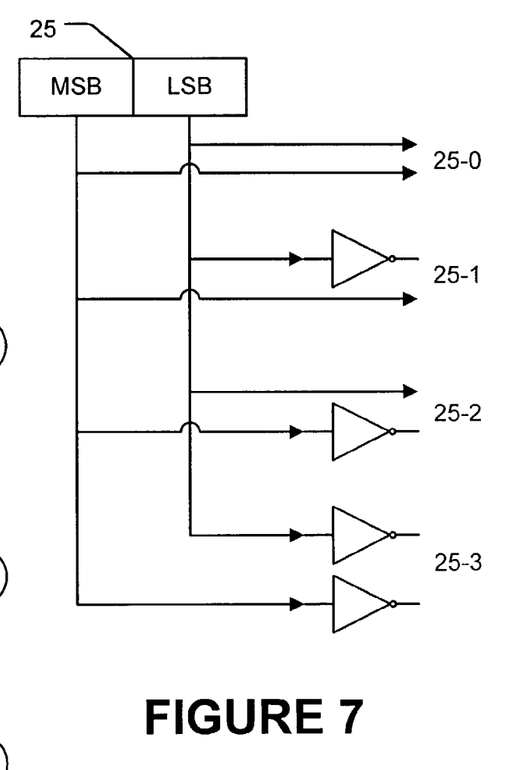
FIG. 7 illustrates the use of a 2-bit counter to generate memory section selection values.

While the memory sections are described herein as being simultaneously accessible, this means only that parts of the software can be retrieved from each of the memory sections in a single memory access cycle.

Where the memory section access control comprises a counter 25 as shown in FIG. 1, it is not necessary that there be a separate counter 25 corresponding to every memory section. A single counter 25 may be used to generate suitable memory section selection values 25-0, 25-1, 25-2 and 25-3 for all of the input and output multiplexers as shown in FIG. 7.

Figure 9:
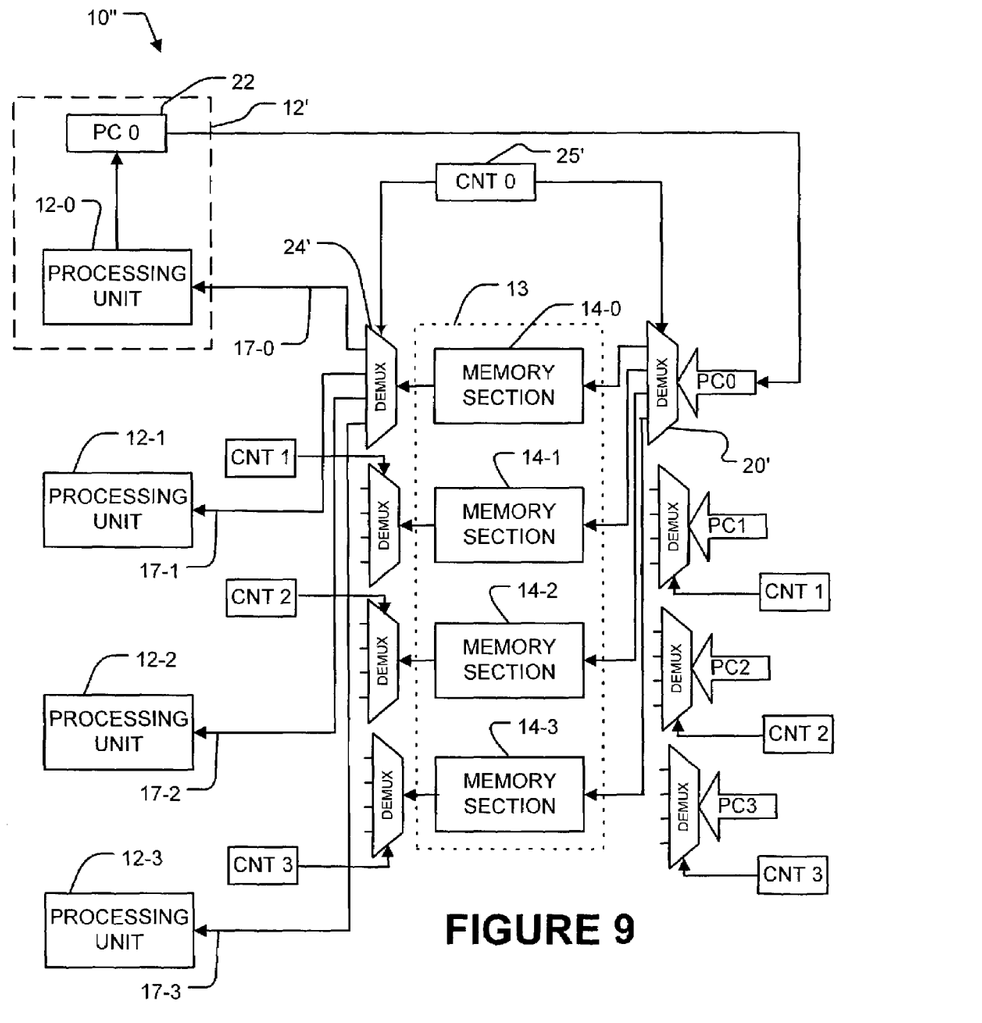

It is not necessary to configure the output multiplexers as depicted in FIG. 1. In an alternative embodiment 10″ depicted in FIG. 9, each memory section 14 is associated with an output demultiplexer 24′. The output of a particular memory section 14 is connected to the input of its corresponding output demultiplexer 24′ and the four outputs of output demultiplexer 24′ are connected to respective processing units 12. With such a configuration, the control input 25′ for each demultiplexer 24′ operates to select a particular one of the processing units 12 to receive data from among the other processing units 12 connected to that demultiplexer 24′.

Similarly, it is not necessary to configure the input multiplexers as depicted in FIG. 1. In the alternative embodiment 10″ depicted in FIG. 9, each processing unit 12 is associated with an input demultiplexer 20′. The program counter of a particular processing unit 12 is connected to the input of its corresponding input demultiplexer 20′ and the four outputs of input demultiplexer 20′ are connected to respective memory sections 14. With such a configuration, the control input 25′ for each demultiplexer 20′ operates to select a particular one of the memory sections 14 to receive an instruction request from among the other memory sections connected to that demultiplexer 20′.

Accordingly, the scope of the invention is to be construed in accordance with the substance defined by the following claims.

What is claimed is:

1. An apparatus comprising:
a plurality of processing units;
a memory structure comprising a number of simultaneously accessible memory sections, the number of memory sections being at least equal to a number of the processing units, the memory structure holding software comprising a plurality of sequential parts with the parts distributed between the memory sections such that sequential parts are in sequential memory sections;
a program counter associated with each of the processing units; and,
a memory section access control connected between the processing units and the memory structure, the memory section access control configured to permit, on each of a plurality of successive memory access cycles, each of the processing units to retrieve one of the parts of the software from a different one of the memory sections, the memory section access control permitting at least one of the processing units to retrieve sequential ones of the parts of the software from sequential ones of the memory sections on sequential memory access cycles,
wherein the memory section access control is configured to permit each of the plurality of processing units to retrieve successive ones of the parts of the software from successive ones of the memory sections on successive memory access cycles,
wherein the memory section access control comprises a plurality of input multiplexers, one of the plurality of multiplexers associated with each of the memory sections, each of the input multiplexers having a plurality of inputs connected to receive values from each of the program counters and an output connected to provide the value from one of the program counters to the associated memory section, and
wherein each of the input multiplexers comprises a control input and the memory section access control is configured to provide a memory section selection value to each of the input multiplexer control inputs input in each of the memory access cycles, the memory section selection value at each of the control inputs corresponding to a different one of the processing units, the memory section selection value at each of the input multiplexer control inputs changing in each memory access cycle and cycling through values corresponding to all of the processing units.

2. A method for providing $2^m$ processing units, where m is a positive integer, with access to a shared instructions memory containing a set of instructions to be executed by the processing units in a predetermined sequential order, the method comprising:
partitioning said shared instructions memory into at least $2^m$ memory sections;
distributing the set of instructions among said memory sections such that parts of said set of instructions are stored in different memory sections based on a predefined interleaving arrangement;
in a current memory access cycle, retrieving at each of the processing units a part of said set of instructions from a different one of the memory sections;

said step of retrieving comprising:
maintaining a count value at each said processing unit for indicating a next part to be retrieved by said processing unit;
establishing a distinct memory section selection value for each said processing unit and initializing a counter associated with each said memory section with said respective memory section selection value;
controlling access to each said memory section with a respective input and output multiplexer; and
controlling said input and output multiplexers with said memory section selection value and controlling said input multiplexer with said count value,
whereby said next part is selected based on said predefined interleaving arrangement of the parts in said memory sections and according to said predetermined sequential order.

3. A method as claimed in claim 2, further comprising, for a next memory access cycle:
changing said memory section selection value for each said memory section to a new memory section selection value to indicate the next memory section which stores a subsequent part of said set of instructions to be executed by said respective processing unit;
advancing said count value at each said processing units to a new count value for identifying said subsequent part; and
retrieving at each of the processing units, said subsequent part of said set of instructions from a respective memory section identified based on said new memory section selection value and said new count value.

4. An apparatus for enabling $2^m$ processing units, where m is a positive integer, to share a set of instructions, each processing unit accessing instructions from said set in a specific order, said apparatus comprising:
a memory structure comprising at least $2^m$ memory sections, each section holding parts of said set of instructions stored in a predefined interleaving arrangement;
a program counter associated with each processing unit, each program counterstoring a count value indicating a next part of said set of instructions to be fetched by said respective processing unit from said memory structure during a memory access cycle; and,
a memory section access control configured to permit all said processing units to simultaneously access different ones of the memory sections during said memory access cycle, said memory sections being selected according to said predefined interleaving arrangement and according to the count values stored in program counters associated with respective ones of said processing units,
wherein said memory section access control comprises, for each said memory section, a counter for storing a memory section selection value used for enabling one processing unit to identify said memory section during said memory access cycle, whereby each processing unit has access to a different one of memory sections, and
wherein said memory section access control further comprises, for each memory section:
an input multiplexer that enables each said processing unit to access said next part of said set of instructions based on said count value in said respective program counter and said memory section selection value in said counter; and
an output multiplexer that enables each said processing unit to transfer said next part of said set of instructions accessed from said memory section identified by said memory section selection value.

5. An apparatus as claimed in claim 4 wherein each of the output multiplexers has an output connected to one of the processing units over an instruction bus, and a plurality of inputs, each input connected to one of the memory sections for receiving said next part of said set of instructions.

6. An apparatus as claimed in claim 5 wherein the instruction buses have widths of one of 8 bits, 16 bits, and 32 bits.

7. An apparatus as claimed in claim 5 wherein the instruction buses of each of the processing units has a width equal to a size of a part of said set of instructions.

8. An apparatus as claimed in claim 4 wherein each output multiplexer and each input multiplexer of a respective memory section comprises a control input connected to receive the memory section selection value from said counter.

9. An apparatus as claimed in claim 4 wherein said memory section selection value is provided on a control input of a respective input multiplexer and output multiplexer in each of the memory access cycles, to enable identification of said next part of said set of instructions and transfer of said next part of said set of instructions from said respective memory section to one processing unit, wherein said memory section selection value changes in each memory access cycle to enable each processing unit to fetch all of the parts of said set of instructions.

* * * * *